(12) United States Patent
Peck et al.

(10) Patent No.: US 10,773,489 B2
(45) Date of Patent: Sep. 15, 2020

(54) GLASS ARTICLE HAVING PERPENDICULAR DRAW LINES

(71) Applicant: AGC Automotive Americas Co., Alpharetta, GA (US)

(72) Inventors: Timothy D. Peck, White Lake, MI (US); Rachael M. Blodgett, Canton, MI (US)

(73) Assignee: AGC Automotive Americas Co., Alpharetta, GA (US)

( * ) Notice: Subject to any disclaimer, the term of this patent is extended or adjusted under 35 U.S.C. 154(b) by 131 days.

(21) Appl. No.: 15/994,943

(22) Filed: May 31, 2018

(65) Prior Publication Data
US 2019/0366693 A1    Dec. 5, 2019

(51) Int. Cl.
*B32B 7/03*    (2019.01)
*B32B 17/10*   (2006.01)
(Continued)

(52) U.S. Cl.
CPC ............... *B32B 7/03* (2019.01); *B32B 3/00* (2013.01); *B32B 7/02* (2013.01); *B32B 17/10036* (2013.01); *B32B 17/10119* (2013.01); *B32B 17/10146* (2013.01); *B32B 17/10889* (2013.01); *B60J 1/008* (2013.01); *C03C 3/078* (2013.01);
(Continued)

(58) Field of Classification Search
CPC ......... B32B 7/00–7/14; B32B 17/00–17/1099; C03C 17/00–17/44; C03C 3/00–3/328
See application file for complete search history.

(56) References Cited

U.S. PATENT DOCUMENTS 3,083,551 A    4/1963   Pilkington
3,700,542 A    10/1972  Davis
(Continued)

FOREIGN PATENT DOCUMENTS

EP    3252022 A1    12/2017
JP    2007290549 A  11/2007
(Continued)

OTHER PUBLICATIONS

"Raw Materials". https://www.pilkington.com/en/global/about/education/the-float-process/raw-materials. Retrieved Mar. 3, 2020.*
(Continued)

*Primary Examiner* — Prashant J Khatri
(74) *Attorney, Agent, or Firm* — Howard & Howard Attorneys PLLC

(57) ABSTRACT

A glass article has substantially perpendicular draw lines and includes a first outermost pane having a thickness of from 1.1 to 4.0 mm. The glass article also includes a second outermost pane disposed opposite the first outermost pane and having a thickness of from 0.3 to 1.05 mm. The glass article further includes a transparent interlayer disposed between the first and second outermost panes. Each of the first outermost pane and the second outermost pane independently has a length and includes draw lines that extend along the length. The first outermost pane is bonded to the second outermost pane via the transparent interlayer such that the draw lines of the first outermost pane are disposed substantially perpendicularly to the draw lines of the second outermost pane.

20 Claims, 3 Drawing Sheets

(51) Int. Cl.
*C03C 3/087* (2006.01)
*C03C 3/083* (2006.01)
*B32B 3/00* (2006.01)
*B32B 7/02* (2019.01)
*C03C 3/078* (2006.01)
*B60J 1/00* (2006.01)

(52) U.S. Cl.
CPC .............. *C03C 3/083* (2013.01); *C03C 3/087* (2013.01); *B32B 17/1077* (2013.01); *B32B 17/10761* (2013.01); *B32B 17/10788* (2013.01); *B32B 2605/006* (2013.01)

(56) References Cited

U.S. PATENT DOCUMENTS

| | | | |
|---|---|---|---|
| 3,700,543 A | 10/1972 | Davis | |
| 6,150,028 A * | 11/2000 | Mazon | B32B 17/10036 428/332 |
| 7,892,999 B2 | 2/2011 | Nagai et al. | |
| 8,495,895 B2 | 7/2013 | Yamada et al. | |
| 10,343,378 B2 | 7/2019 | Lestringant et al. | |
| 2013/0295358 A1* | 11/2013 | Paulus | B32B 17/10036 428/215 |
| 2015/0251377 A1* | 9/2015 | Cleary | B32B 17/10119 428/172 |
| 2016/0257095 A1* | 9/2016 | Cleary | G02B 27/01 |
| 2017/0008377 A1 | 1/2017 | Fisher et al. | |
| 2017/0050415 A1 | 2/2017 | Kanki et al. | |
| 2018/0370194 A1* | 12/2018 | Claireaux | C03C 21/002 |

FOREIGN PATENT DOCUMENTS

| | | | |
|---|---|---|---|
| WO | 2015059407 A1 | 4/2015 | |
| WO | WO-2016177592 A1 * | 11/2016 | ............. C03C 3/087 |
| WO | 2017099166 A1 | 6/2017 | |
| WO | WO-2017103471 A1 * | 6/2017 | ........... C03C 21/002 |

OTHER PUBLICATIONS

English language abstract and machine-assisted English translation for JP 2007-290549 extracted from espacenet.com database on Jun. 21, 2018, 16 pages.

English language abstract and machine-assisted English translation for WO 2017/099166 extracted from espacenet.com database on Jun. 21, 2018, 23 pages.

English language abstract for WO 2015/059407 extracted from espacenet.com database on Oct. 21, 2019, 1 page.

\* cited by examiner

GLASS ARTICLE HAVING PERPENDICULAR DRAW LINES

FIELD OF THE DISCLOSURE

This disclosure generally relates to a glass article having substantially perpendicular draw lines. More specifically, this disclosure relates to a glass article having two panes of glass wherein the draw lines of a first outermost pane and a second outermost pane are disposed substantially perpendicularly to each other which results in superior optical properties.

BACKGROUND

It is known to make windshields by laminating a first ply of glass, a plastic interlayer, and a second ply of glass. Before 1960, the plies of glass used in this process were ground and polished plate glass, which has excellent freedom from distortion. More recently, it has been customary to use float glass from 1.1 to 4 mm thick for the first and second plies. The float glass is produced by a process such as that described in U.S. Pat. Nos. 3,083,551 and 3,700,542.

In a float glass process, glass is drawn in a direction. This process tends to cause optical distortions in the glass, also known as draw lines. These draw lines are optical distortions that extend parallel to the direction that the glass is being floated. Typically, the draw lines include a series of semi-cylindrical lenses at each surface of the drawn glass relative to a center plane of the glass. The draw lines are substantially parallel to one another and alternate between convex and concave approximate semi-cylindrical lenses.

When forming windshields, it is desirable to minimize the distortions and improve optical quality. To do so, it is conventional wisdom to align the draw lines of the first ply with the draw lines of the second ply to minimize distortion. To cross the draw lines or to arrange them perpendicularly to one another is known in the art to cause severe optical distortions thereby rendering the windshield unusable. Accordingly, there remains opportunity for improvement.

BRIEF DESCRIPTION OF THE FIGURES

Other advantages of the present disclosure will be readily appreciated, as the same becomes better understood by reference to the following detailed description when considered in connection with the accompanying drawings wherein.

SUMMARY OF THE DISCLOSURE

This disclosure provides a glass article having substantially perpendicular draw lines. The glass article includes a first outermost pane including having a thickness of from 1.1 to 4.0 mm. The glass articles also includes a second outermost pane disposed opposite the first outermost pane and having a thickness of from 0.3 to 1.05 mm. The glass article further includes a transparent interlayer disposed between with the first and second outermost panes. Each of the first outermost pane and the second outermost pane independently has a length and includes draw lines that extend along the length. Moreover, the first outermost pane is bonded to the second outermost pane via the transparent interlayer such that the draw lines of the first outermost pane are disposed substantially perpendicularly to the draw lines of the second outermost pane. The substantially perpendicular draw lines, in conjunction with the thicker first outermost pane and the thinner second outermost pane, lead to unexpected excellent optical qualities.

DETAILED DESCRIPTION OF THE DISCLOSURE

Figure 1:
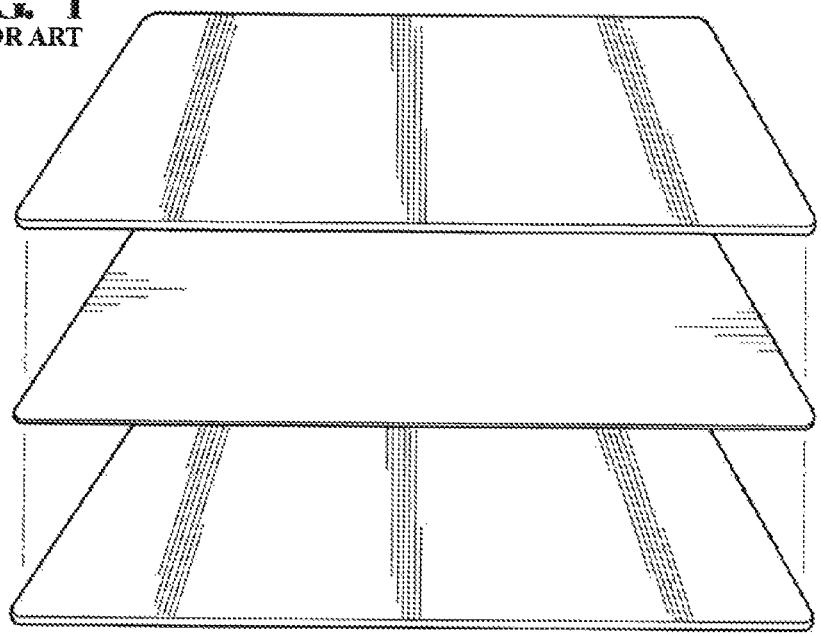
FIG. 1 is an exploded view of a prior art glass article that includes a first and a second outermost pane each having draw lines and a transparent interlayer disposed between the first and second outermost panes, wherein the draw lines of the first outermost pane are disposed parallel to the draw lines of the second outermost pane.
Figure 2:
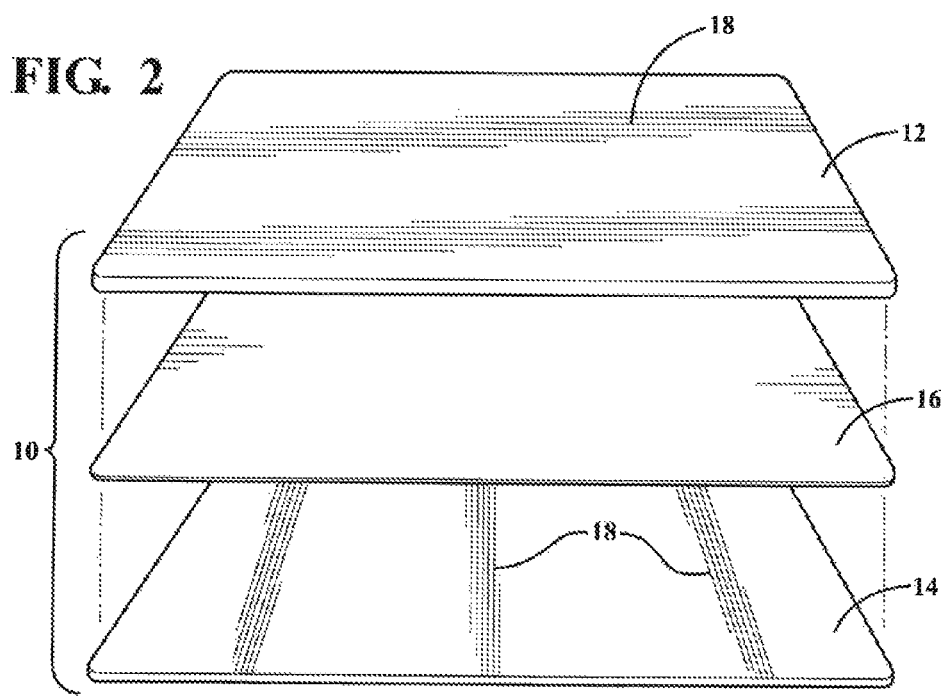
FIG. 2 is an exploded view of one embodiment of the glass article of this disclosure that includes a first and a second outermost pane each having draw lines and a transparent interlayer disposed between the first and second outermost panes, wherein the draw lines of the first outermost pane are disposed substantially perpendicularly to the draw lines of the second outermost pane.
Figure 3:
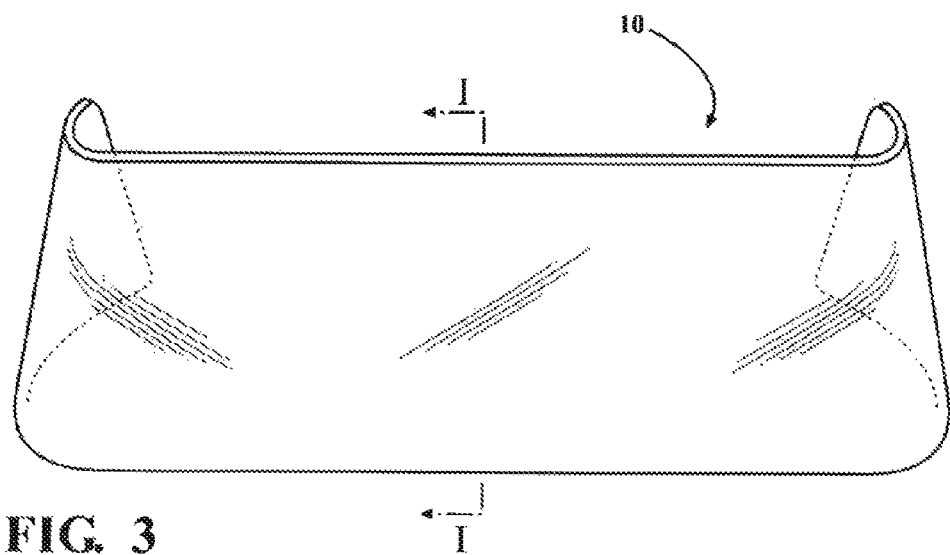
FIG. 3 is a perspective view of a windshield fabricated from the glass article of FIG. 2.

This disclosure provides a glass article 10 having a first outermost pane 12, a second outermost pane 14 and an interlayer 16, e.g. as shown in FIG. 2. The glass article 10 is not particularly limited in type, construct, or design except as described herein. For example, the glass article 10 is typically a windshield, e.g. for use in automobiles, trucks, trains, ships airplanes, etc., e.g. as is shown in FIG. 3. Most typically, the glass article 10 is the front windshield of an automobile. The glass article 10 also has substantially perpendicular draw lines 18, as is described in greater detail below.

The glass article 10 includes a first outermost pane 12 and a second outermost pane 14. Alternatively, one or both outermost panes 12,14 may be described as a layer or sheet. The terminology "outermost" describes that the first and second outermost panes 12,14 are disposed on the outside of the article 10 and do not have any other layers on top of themselves. In other words, these outermost panes 12,14 face the environment and are the most exterior of the article 10. The first and second outermost panes 12,14 can be alternatively described as top and bottom panes, outside panes, front and back panes, or exterior panes. Typically, the first outermost pane 12 of the article 10, if an automobile windshield, faces the exterior of the automobile while the second outermost pane 14 faces the interior of the automobile. Accordingly, in some embodiments, the first and second outermost panes 12,14 may be alternatively described as outer facing and inner facing panes of an automobile windshield, respectively.

Figure 5:
FIG. 5 is a side view of a glass article that includes a first outermost pane, a second outermost pane, and a transparent interlayer that are each curved and complementary in shape to one another.
Figure 6:
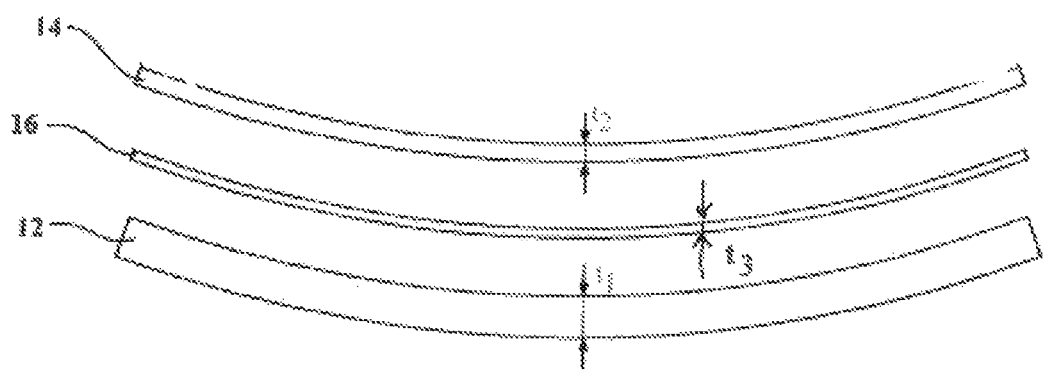
FIG. 6 is an exploded view of the glass article of FIG. 5 that includes thicknesses $t_1$, $t_2$, and $t_3$.

The first and second outermost panes 12, 14 may have any shape and size. Typically, the first and second outermost panes 12, 14 are complementary in shape, e.g. as shown in FIGS. 5 and 6. In one embodiment, the first and second outermost panes 12, 14 are each curved. The first and second outermost panes 12,14 may each independently have a crossbend at center of 0.1 to 100 mm. Alternatively, the first and second outermost panes 12,14 may each independently have a crossbend at center of 0.1 to 50 mm. The first and second outermost panes 12,14 also may each independently have a radius of curvature of 0 to 100,000 mm. Alternatively, the first and second outermost panes 12,14 also may each independently have a radius of curvature of 0 to 50,000 mm. In other embodiments, all values and ranges of values including and between those described above are expressly contemplated. The crossbend at center and the radius of curvature may be determined with a CMM bench, or any other suitable 3D physical measurement device. For example, the crossbend may be determined using a LP-150F-C Conductive Plastic Linear Sensor manufactured by Green Pot and the radius of curvature may be determined using a 5200 Spring Loaded Probes manufactured by Linear Measurement Instruments (LMI), Corp.

Figure 4:
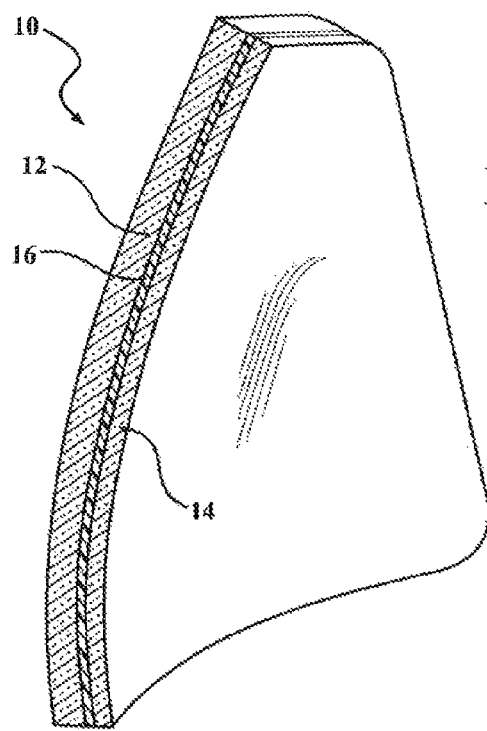
FIG. 4 is a sectional view of the windshield of FIG. 3 taken along the Line I.

The first outermost pane 12 has a thickness ($t_1$) of from 1.1 to 4.0 mm, e.g. as shown in FIG. 4. In various embodiments, the thickness ($t_1$) is 1.1, 1.15, 1.2, 1.25, 1.3, 1.35, 1.4, 1.45, 1.5, 1.55, 1.6, 1.65, 1.7, 1.75, 1.8, 1.85, 1.9, 1.95, 2.0, 2.05, 2.1, 2.15, 2.2, 2.25, 2.3, 2.35, 2.4, 2.45, 2.5, 2.55, 2.6, 2.65, 2.7, 2.75, 2.8, 2.85, 2.9, 2.95, 3.0, 3.05, 3.1, 3.15, 3.2, 3.25, 3.3, 3.35, 3.4, 3.45, 3.5, 3.55, 3.6, 3.65, 3.7, 3.75, 3.8, 3.85, 3.9, 3.95, 4.0, mm. In other embodiments, all values and ranges of values including and between those described above are expressly contemplated. The length and width of the first outermost pane are not particularly limited and may be chosen by one of skill in the art.

The second outermost pane 14 is disposed opposite the first outermost pane 12, i.e., on an opposite side of the glass article 10. The second outermost pane 14 is typically described as ultrathin glass (UTG) and has a thickness ($t_2$) of from 0.3 to 1.05 mm, e.g. as shown in FIG. 6. In various embodiments, the thickness ($t_2$) is 0.3, 0.35, 0.4, 0.45, 0.5, 0.55, 0.6, 0.65, 0.7, 0.75, 0.8, 0.85, 0.9, 0.95, 1.0, or 1.05, mm. In other embodiments, all values and ranges of values including and between those described above are expressly contemplated. The length and width of the second outermost pane are not particularly limited and may be chosen by one of skill in the art.

The first and second outermost panes 12,14 may have the same or different chemical compositions. For example, the first and second outermost panes 12, 14 may independently be, include, consist essentially of, or consist of, soda-lime glass, as is understood in the art. The terminology "consist essentially of" describes embodiments wherein the soda-lime glass is free from additives, compounds, reactants, or elements of other types of glass, as recognized in the art, such as aluminosilicate glass. In various embodiments the article as a whole and/or the first and second outermost panes are free of aluminosilicate glass, ground glass, plate glass, etc.

In various embodiments, the first and/or second outermost panes 12,14 include, are, consist essentially of, or consist of, soda-lime glass having following compositions:

| Compound | Embodiment 1 | Embodiment 2 |
|---|---|---|
| $SiO_2$ | 60 to 80 weight % | 65 to 75 weight % |
| $Al_2O_3$ | 0 to 5 weight % | 0 to 3 weight % |
| CaO | 5 to 20 weight % | 5 to 15 weight % |
| MgO | 0 to 15 weight % | 0 to 10 weight % |
| $Na_2O$ | 5 to 20 weight % | 5 to 15 weight % |
| $K_2O$ | 0 to 8 weight % | 0 to 5 weight % |
| $Na_2O$ and $K_2O$ in total | 10 to 20 weight % | 10 to 15 weight % |

In other embodiments, all values and ranges of values including and between those described above are expressly contemplated. For example, all whole values and fractional values to the tenth position, e.g., 0.1, 1.1, etc. between those described above, are hereby expressly contemplated in various non-limiting embodiments.

In further embodiments, the first and/or second outermost panes 12,14 include, are, consist essentially of, or consist of, soda-lime glass including the following elements:

| Element | Embodiment 3 | Embodiment 4 |
|---|---|---|
| Oxygen | 45 to 55 weight % | 48 to 54 weight % |
| Sodium | 0 to 7 weight % | 0 to 5 weight % |
| Magnesium | 0 to 7 weight % | 0 to 5 weight % |
| Aluminum | 0 to 5 weight % | 0 to 3 weight % |
| Silicon | 20 to 40 weight % | 25 to 35 weight % |
| Potassium | 0 to 15 weight % | 5 to 15 weight % |
| Calcium | 3 to 10 weight % | 3 to 7 weight % |

In other embodiments, all values and ranges of values including and between those described above are expressly contemplated. For example, all whole values and fractional values to the tenth position, e.g., 0.1, 1.1, etc. between those described above, are hereby expressly contemplated in various non-limiting embodiments.

In still other embodiments, the second outermost pane 14 includes, is, consists essentially of, or consists of aluminosilicate glass having the following compositions:

| Compound | Embodiment 5 | Embodiment 6 | Embodiment 7 | Embodiment 8 | Embodiment 9 |
|---|---|---|---|---|---|
| $SiO_2$ | 60 to 80 mol % | 65 to 70 mol % | 62 to 78 mol % | 62 to 65 mol % | 62 to 78 mol % |
| $B_2O_3$ | 0 to 10 mol % | 0 to 5 mol % | 0 to 7 mol % | 0 to 5 mol % | 0 to 3 mol % |
| $Al_2O_3$ | 0 to 15 mol % | 2 to 12 mol % | 0 to 15 mol % | 1 to 4 mol % | 6 to 15 mol % |
| $P_2O_5$ | 0 to 10 mol % | 0 to 5 mol % | 0 to 10 mol % | 0 to 5 mol % | 0 to 10 mol % |
| $Li_2O$ | 0 to 10 mol % | 0 to 5 mol % | 0 to 10 mol % | 0 to 5 mol % | 0 to 10 mol % |
| $Na_2O$ | 10 to 20 mol % | 12 to 18 mol % | 12 to 20 mol % | 15 to 18 mol % | 10 to 20 mol % |
| $K_2O$ | 0 to 5 mol % | 0 to 3 mol % | 0 to 5 mol % | 0 to 2 mol % | 2 to 10 mol % |
| MgO | 5 to 20 mol % | 5 to 15 mol % | 10 to 20 mol % | 12 to 18 mol % | 5 to 20 mol % |
| CaO | 0 to 10 mol % | 5 to 10 mol % | 1 to 5 mol % | 1 to 3 mol % | 0 to 5 mol % |
| SrO | 0 to 3 mol % | 0 to 1 mol % | 0 to 3 mol % | 0 to 1 mol % | 0 to 3 mol % |
| BaO | 0 to 3 mol % | 0 to 1 mol % | 0 to 3 mol % | 0 to 1 mol % | 0 to 3 mol % |
| ZnO | 0 to 3 mol % | 0 to 1 mol % | 0 to 3 mol % | 0 to 1 mol % | 0 to 3 mol % |
| $ZrO_2$ | 0 to 3 mol % | 0 to 1 mol % | 0 to 3 mol % | 0 to 1 mol % | 0 to 3 mol % |
| $TiO_2$ | 0 to 3 mol % | 0 to 1 mol % | 0 to 3 mol % | 0 to 1 mol % | 0 to 3 mol % |
| $SnO_2$ | 0 to 3 mol % | 0 to 1 mol % | 0 to 3 mol % | 0 to 1 mol % | 0 to 3 mol % |
| Cl | 0 to 3 mol % | 0 to 1 mol % | 0 to 3 mol % | 0 to 1 mol % | 0 to 3 mol % |

In further embodiments, the second outermost pane 14 includes, is, consists essentially of, or consists of aluminosilicate glass having the following compositions:

| Compound | Embodiment 10 | Embodiment 11 | Embodiment 12 | Embodiment 13 | Embodiment 14 |
| --- | --- | --- | --- | --- | --- |
| $SiO_2$ | 62 to 70 mol % | 65 to 75 mol % | 66 to 74 mol % | 60 to 72 mol % | 62 to 66 mol % |
| $B_2O_3$ | 0 to 1 mol % | 0 to 10 mol % | 0 to 3 mol % | 0 to 5 mol % | 0 to 3 mol % |
| $Al_2O_3$ | 6 to 10 mol % | 5 to 20 mol % | 8 to 14 mol % | 5 to 10 mol % | 6 to 15 mol % |
| $P_2O_5$ | 0 to 3 mol % | 0 to 5 mol % | 0 to 2 mol % | 0 to 10 mol % | 0 to 5 mol % |
| $Li_2O$ | 0 to 3 mol % | 0 to 5 mol % | 0 to 2 mol % | 0 to 10 mol % | 0 to 5 mol % |
| $Na_2O$ | 10 to 15 mol % | 10 to 20 mol % | 10 to 15 mol % | 10 to 20 mol % | 12 to 18 mol % |
| $K_2O$ | 2 to 6 mol % | 0 to 5 mol % | 0 to 2 mol % | 0 to 5 mol % | 0 to 2 mol % |
| MgO | 10 to 15 mol % | 5 to 20 mol % | 5 to 12 mol % | 5 to 20 mol % | 5 to 12 mol % |
| CaO | 0 to 1 mol % | 0 to 3 mol % | 0 to 1 mol % | 0 to 3 mol % | 0 to 1 mol % |
| SrO | 0 to 1 mol % | 0 to 3 mol % | 0 to 1 mol % | 0 to 3 mol % | 0 to 1 mol % |
| BaO | 0 to 1 mol % | 0 to 3 mol % | 0 to 1 mol % | 0 to 3 mol % | 0 to 1 mol % |
| ZnO | 0 to 1 mol % | 0 to 3 mol % | 0 to 1 mol % | 0 to 3 mol % | 0 to 1 mol % |
| $ZrO_2$ | 0 to 1 mol % | 0 to 3 mol % | 0 to 1 mol % | 0 to 3 mol % | 0 to 1 mol % |
| $TiO_2$ | 0 to 1 mol % | 0 to 3 mol % | 0 to 1 mol % | 0 to 3 mol % | 0 to 1 mol % |
| $SnO_2$ | 0 to 1 mol % | 0 to 3 mol % | 0 to 1 mol % | 0 to 3 mol % | 0 to 1 mol % |
| Cl | 0 to 1 mol % | 0 to 3 mol % | 0 to 1 mol % | 0 to 3 mol % | 0 to 1 mol % |

In other embodiments, all values and ranges of values including and between those described above are expressly contemplated. For example, all whole values and fractional values to the tenth position, e.g., 0.1, 1.1, etc. between those described above, are hereby expressly contemplated in various non-limiting embodiments.

In even further embodiments, the second outermost pane 14 includes, is, consists essentially of, or consists of aluminosilicate glass having the following compositions:

| Element | Embodiment 15 | Embodiment 16 |
| --- | --- | --- |
| Oxygen | 45 to 55 weight % | 48 to 54 weight % |
| Sodium | 0 to 7 weight % | 0 to 5 weight % |
| Magnesium | 0 to 7 weight % | 0 to 5 weight % |
| Aluminum | 1 to 5 weight % | 1 to 3 weight % |
| Silicon | 20 to 40 weight % | 25 to 35 weight % |
| Potassium | 0 to 15 weight % | 5 to 15 weight % |
| Calcium | 0 to 5 weight % | 0 to 3 weight % |

In other embodiments, all values and ranges of values including and between those described above are expressly contemplated. For example, all whole values and fractional values to the tenth position, e.g., 0.1, 1.1, etc. between those described above, are hereby expressly contemplated in various non-limiting embodiments.

In even further embodiments, the first outermost pane 12 is soda-lime glass including: $Al_2O_3$: 0 to 2.0 weight %, and $Na_2O$ and $K_2O$ in total: 13.0 to 15.5 weight % while the second outermost pane is soda-lime glass including: $Al_2O_3$: 0 to 3.5 weight %, and $Na_2O$ and $K_2O$ in total: 12.0 to 14.5 weight %. In another embodiment, the first outermost pane is soda-lime glass including $SiO_2$: 68.0 to 75.0 weight %, $Al_2O_3$: 0 to 2.0 weight %, CaO: 7.0 to 13.0 weight %, MgO: 0 to 7.0 weight %, $Na_2O$: 12.0 to 15.0 weight %, $K_2O$: 0 to 3.0 weight %, and $Na_2O$ and $K_2O$ in total: 13.0 to 15.5 weight % while the second outermost pane 14 is soda-lime glass including: $SiO_2$: 68.0 to 75.0 weight %, $Al_2O_3$: 0 to 3.5 weight %, CaO: 7.0 to 13.0 weight %, MgO: 0 to 7.0 weight %, $Na_2O$: 12.0 to 15.0 weight %, $K_2O$: 0 to 3.0 weight %, $Na_2O$ and $K_2O$ in total: 12.0 to 14.5 weight %, and $Na_2O$ and $K_2O$ in total: 13.0 to 15.5 weight %. In other embodiments, all values and ranges of values including and between those described above are expressly contemplated. For example, all whole values and fractional values to the tenth position, e.g., 0.1, 1.1, etc. between those described above, are hereby expressly contemplated in various non-limiting embodiments.

In still other embodiments, the soda-lime glass of the first outermost pane and/or the second outermost pane 12,14 each independently includes: $SiO_2$ in an amount of from 65 to 75 weight %, $Al_2O_3$ in an amount of from 0 to 3 weight %, CaO in an amount of from 5 to 15 weight %, MgO in an amount of from 0 to 10 weight %, $Na_2O$ in an amount of from 5 to 15 weight %, and $K_2O$ in an amount of from 0 to 5 weight %, wherein a sum of the amounts of $Na_2O$ and $K_2O$ is from 10 to 15 weight %, each based on a total weight of said soda-lime glass.

If the second outermost pane 14 includes aluminosilicate glass, and also in independent embodiments, the aluminosilicate glass may comprise $SiO_2$ in an amount of from 60 to 70 weight %, $B_2O_3$ in an amount of from 0 to 5 weight %, $Al_2O_3$ in an amount of from 1 to 15 weight %, $P_2O_5$ present in an amount of from 0 to 5 weight %, $Li_2O$ present in an amount of from 0 to 5 weight %, $Na_2O$ present in an amount of from 12 to 18 weight %, $K_2O$ present in an amount of from 0 to 5 weight %, MgO present in an amount of from 5 to 12 weight %, CaO present in an amount of from 0 to 10 weight %, SrO present in an amount of from 0 to 5 weight %, BaO present in an amount of from 0 to 5 weight %, ZnO present in an amount of from 0 to 5 weight %, $ZrO_2$ present in an amount of from 0 to 5 weight %, $TiO_2$ present in an amount of from 0 to 5 weight %, $SnO_2$ present in an amount of from 0 to 5 weight %, and Cl present in an amount of from 0 to 5 weight %. For example, all whole values and fractional values to the tenth position, e.g., 0.1, 1.1, etc. between those described above, are hereby expressly contemplated in various non-limiting embodiments. It is contemplated that the second outermost pane 14 may be a combination, mixture, or hybrid, of soda-lime glass and aluminosilicate glass.

The glass article 10 further includes a transparent interlayer 16 that is disposed between and the first and second outermost panes 12,14. In other words, the transparent interlayer 16 is sandwiched between the first and second outermost panes 12,14. In certain embodiments, the transparent interlayer 16 is in direct contact with the first and second outermost panes 12,14 without any intervening layers, such as tie layers, e.g. as shown in FIG. 4. In other embodiments, a portion of the transparent layer 16 is in direct contact with both the first and second outermost panes 12,14. For example, a portion of the transparent layer 16 may be in direct contact with both the first and second outermost panes 12,14 when the glass article 10 includes black ceramic edging, heated grid lines, etc. In still further embodiments, the transparent interlayer 16 may be disposed between the first and second outermost panes 12,14 with the transparent interlayer 16 physically separated from one or both of the first or second outermost panes 12,14, such as, for example, when the glass article includes a layer of silver or other coating layer. It is to be appreciated that even when the transparent interlayer 16 is physically separated (e.g. by a silver coating) from the first and/or second outermost panes 12,14, the first outermost pane 12 is still bonded to the second outermost pane 14 via the transparent interlayer, because the transparent interlayer is disposed between the first and second outermost panes 12,14. The terminology "transparent" is as understood in the float glass and windshield arts and typically describes that light passes through the interlayer 16. The transparent interlayer 16 is not opaque.

The transparent interlayer 16 also is not particularly limited in size and shape and is shaped most often in a shape complementary to the shape of the first and second outermost panes 12,14, e.g. as shown in FIGS. 5 and 6. The transparent interlayer 16 typically has a thickness ($t_3$) of from 0.3 to 2.28 mm, e.g. as shown in FIG. 4. In various embodiments, the thickness ($t_3$) is 0.3, 0.35, 0.4, 0.45, 0.5, 0.55, 0.6, 0.65, 0.7, 0.75, 0.76, 0.8, 0.85, 0.9, 0.95, 1.0, 1.05, 1.1, 1.15, 1.2, 1.25, 1.3, 1.35, 1.4, 1.45, 1.5, 1.52, 1.55, 1.6, 1.65, 1.7, 1.75, 1.8, 1.85, 1.9, 1.95, 2.0, 2.05, 2.1, 2.15, 2.2, 2.25, or 2.28 mm. All ranges and values including and between those described above are also hereby expressly contemplated for use herein in various non-limiting embodiments.

The transparent interlayer 16 is not particularly limited in composition and typically is or includes polyvinyl butyral or ethylene-vinyl acetate. The transparent interlayer 16 may be utilized as a sheet, as a polymer, or as individual reactive components that then react to form the transparent interlayer 16. The transparent interlayer 16 may be provided in a cured, partially cured, or uncured state. Other non-limiting examples of suitable polymers to use for the transparent interlayer 16 include plasticized polyvinyl butyral, polyurethanes, etc. The transparent interlayer 16 may be provided as a non-transparent polymer or compound which then becomes transparent upon heating and/or processing.

In one embodiment, the first outermost pane 12 has a thickness ($t_1$) of 2.1 mm±0.05 mm. In another embodiment, the second outermost pane 14 has a thickness ($t_2$) of 0.7 mm±0.05 mm. In still another embodiment, the transparent interlayer 16 has a thickness ($t_3$) of 0.76 mm±0.25 mm. All ranges and values including and between those described above are also hereby expressly contemplated for use herein in various non-limiting embodiments.

Each of the first outermost pane 12 and the second outermost pane 14 has a length (L) and includes draw lines 18 that extend along the length, e.g. as shown in FIG. 2. In a float glass process, glass is attenuated in the direction in which it is drawn. Such attenuation tends to cause optical distortions in the glass, also known as draw lines 18. These draw lines 18 are optical distortions that extend perpendicularly to the direction that the glass is being floated. More specifically, the draw lines 18 include a series of semicylindrical lenses at each surface of the drawn glass relative to a center plane of the glass wherein the drawlines are parallel to one another and typically alternate between convex and concave semi-cylindrical lenses. Curvatures at the surface of the glass are typically in the opposite sense to one another at any localized area of the glass. The draw lines 18 may be of any dimensions but typically have a height that varies based on the thickness of the particular layer. For example, when the first outermost pane 12 has a thickness of 2.1 mm, the draw lines 18 typically have a height of from 1 to 4 µm. As another example, when the second outermost pane 14 has a thickness of 0.7 mm, the draw lines 18 typically have a height of from 0.5 to 1 µm.

In the glass article 10, the first outermost pane 12 is bonded to the second outermost pane 14 via the transparent interlayer 16 such that the draw lines 18 of the first outermost pane 12 are disposed substantially perpendicularly to the draw lines 18 of the second outermost pane 14. In other words, the draw lines 18 are oriented or arranged in a direction substantially perpendicular to one another. For example, the terminology "substantially perpendicular" may describe that the draw lines are disposed perpendicular to each other (i.e., at a 90° angle to one another), ±1, 2, 3, 4, 5, 6, 7, 8, 9, or 10,°. In other words, the draw lines 18 need not be exactly 90° to one another and may vary. In other embodiments, all values and ranges of values including and between those described above are expressly contemplated.

The glass article 10 typically has excellent optical and strength properties. In various embodiments, the glass article 10 has one or more of the following ISRA values: a central zone of less than 160 milidiopters, a top zone of less than 180 milidiopters, and a side pillar of less than 120 milidiopters. In one embodiment, the glass article 10 has ISRA values of a central zone of less than 160 milidiopters, a top zone of less than 180 milidiopters, and a side pillar of less than 120 milidiopters.

Method of Forming a Glass Article:

The disclosure also provides a method of forming the glass article 10. The method includes the step of forming a first pane of soda-lime glass via a float process wherein the first pane has a thickness of from 1.1 to 4.0 mm. The first pane may be any as described above. The method also includes the step of forming a second pane of soda-lime glass and/or aluminosilicate glass via a float process wherein the second pane has a thickness of from 0.3 to 1.05 mm. The second may also be any as described above. The float process is known in the art and the instant disclosure may utilize any one or more steps of the float process herein.

The method also includes the step of cutting a first blank from the first pane and a second blank from the second pane wherein each blank has a length (L) and includes draw lines 18 that extend along the length (L). The first and second blanks are not limited in size and shape and may be chosen by one of skill in the art. The draw lines 18 of the first and second blanks are the same draw lines 18 as the first and second outermost pane 12, 14, respectively. The blanks may have the same thickness as described above.

Typically, there are two different ways of cutting blanks from the glass produced by glass float production line. The glass float production line produces a continuous "ribbon" of glass, which is then cut into blanks using any technique known it the art. Blanks used for automotive windshields, for example, are often rectangular. The rectangular blanks may be oriented either so the long axis is parallel to the axis of the ribbon of glass from the float, or so the long axis is perpendicular to the axis of the ribbon. After the blanks are cut, it is customary to cut from the blanks pieces of a suitable outline shape to produce glass for a specific window for a specific vehicle, using a pattern cutter. Subsequently, edging, beveling, or inspecting may be completed.

The method further includes the step of forming the first and second blanks into a desired shape. Again, the desired shape may be any chosen by one of skill in the art and may be curved, e.g. for a windshield. Moreover, the step of forming may be completed by any step known in the art. For example, the step of forming may be further defined as bending or curving the first and second blanks. To produce bent blanks, the first and second blanks may be of slightly different outline and have a different orientation of draw lines 18. The first and second blanks may be mounted on a series of bending molds of concave elevation with a suitable parting material between the blanks, such as diatomaceous earth. The glass-laden molds can then be conveyed through an elongated tunnel where the blanks are heated to bending temperature to sag the blanks to the concave elevational shape of the mold. The bent blanks may then be cooled at a controlled rate until they are cool enough for handling. Alternative techniques of forming the first and second blanks into a desired shape include cold bending and press bending.

The method also includes the step of providing an interlayer. The interlayer may be provided as a sheet, as a polymer, or as reactive components that then react to form the transparent interlayer. The interlayer may be provided in a cured, partially cured, or uncured state. For example, the interlayer may be opaque or otherwise non transparent when provided and then may become transparent upon processing or heating. For example, the interlayer may become the transparent interlayer 16 upon processing or heating. Typically, the interlayer is not transparent prior to processing or heating.

The method further includes the step of aligning the first shaped blank, the interlayer, and the second shaped blank such that the draw lines 18 of the first blank are disposed substantially perpendicularly to the draw lines 18 of the second blank. The step of aligning may be any known in the art. Typically, the first shaped blank, the interlayer, and the second shaped blank are rotated such that the draw lines 18 are disposed as described above.

The method also includes the step of combining the first shaped blank, the interlayer, and the second shaped blank thereby forming the glass article 10. The step of combining may include, or may be further defined as, laminating the first shaped blank, the interlayer, and the second shaped blank such that the interlayer changes from opaque or non-transparent to transparent. After lamination, the first shaped blank may be described as the first outermost pane 12. Similarly, after lamination, the second shaped blank may be described as the second outermost pane 14 and the interlayer may be described as the transparent interlayer 16.

In various embodiments, when the first and second shaped blanks are laminated to the interlayer, a sandwich is assembled having one of the bent blanks of the pair having its draw lines 18 extending generally in a first direction disposed on one side of the interlayer to form a concave outer surface of the sandwich to face the interior of a vehicle and the other bent blank of the pair having its distortion lines extending substantially perpendicularly to the first direction disposed on the other side of the interlayer 16 to form a convex outer surface of the sandwich to face the exterior of the vehicle.

In other embodiments, the step of laminating is conducted in two stages. The first stage, e.g. pre-pressing, can be performed using rubber tubing edge channels (i.e., vacuum ring). The matching pairs of bent first and second blanks can be assembled with the interlayer disposed therebetween to form sandwich structures. The tubing can then fitted around an edge periphery of each sandwich and connected to a vacuum source. The pre-pressing can be performed at a set point temperature of approximately 120-150° C. and a target glass temperature of approximately 95° C. for 10-30 minutes under vacuum. Those of ordinary skill in the art will appreciate that alternative methods may also be used for pre-pressing, such as, vacuum bag or nip roller methods. After pre-pressing, the sandwich can then be autoclaved and allowed to cool to room temperature.

EXAMPLES

Five glass articles are formed as automobile windshields. Two of the glass articles (Articles 1 and 2) are representative of embodiments of this disclosure. Three of the glass articles (Comparative Articles 1, 2, and 3) do not represent embodiments of this disclosure, do not include substantially perpendicular draw lines, and are evaluated as comparative examples.

Articles 1 and 2 and Comparative Articles 1-3 are formed and each includes a first outermost pane 12, a transparent interlayer 16, and a second outermost pane 14. Each of the first outermost panes 12 is formed using a soda-lime glass composition. Similarly, each of the second outermost panes 12 is formed using a soda-lime glass composition. Each transparent interlayer 16 is formed using the same polyvinyl butyral. The length and width of the Articles 1 and 2 and Comparative Articles 1-3 are also the same. The difference between these Articles is the orientation of the draw lines 18 and the thicknesses (WO of the first and/or second outermost panes 12, 14, as set forth below. After formation, each of the Articles 1 and 2 and Comparative Articles 1-3 is evaluated using a subjective point light distortion method by one of skill in the art of windshield design and evaluation. The results are set forth below wherein the thicknesses are set forth in (mm) and "perp" signifies perpendicular.

|  | Article 1 | Article 2 | Comparative Article 1 | Comparative Article 2 | Comparative Article 3 |
|---|---|---|---|---|---|
| Thickness of First Outermost Pane ($t_1$) (mm) | 2.00 | 2.10 | 2.00 | 2.00 | 2.00 |
| Thickness of Transparent Interlayer ($t_3$) (mm) | 0.76 | 0.76 | 0.76 | 0.76 | 0.76 |
| Thickness of Second Outermost Pane ($t_2$) (mm) | 0.55 | 0.70 | 0.55 | 2.00 | 2.00 |
| Orientation of Draw Lines | Perp. ± 5° | Perp. ± 5° | Parallel ± 5° | Parallel ± 5° | Perp. ± 5° |
| Point Light Distortion Evaluation | Good | Good | Poor | Good | Poor |

This data surprisingly demonstrates that Articles 1 and 2 that include ultra thin glass (UTG) having a thickness ($t_2$) of approximately 0.70 mm and having substantially perpendicular draw lines have excellent point light distortion qualities. In other words, Articles 1 and 2 exhibit surprisingly good optical qualities that are opposite of what is otherwise expected by one of skill in the art.

It is expected by one of skill in the art that draw lines of multiple glass panes must be disposed parallel to each other to avoid optical distortions. This is seen relative to Comparative Article 2 which does not include ultra thin glass and instead includes standard 2.00 mm thick first and second outermost panes. The vertical/parallel draw lines produce good optical qualities as expected. Similarly, relative to Comparative Article 3, which also does not include ultra thin glass and instead includes standard 2.00 mm thick first and second outermost panes, draw lines disposed perpendicularly to one another produce poor optical qualities, also as expected. Comparative Article 1, which includes ultra thin glass and includes draw lines disposed vertical or parallel to each other produces poor optical qualities. To the contrary, and opposite of what would otherwise be expected, Articles 1 and 2, which include ultra thin glass and draw lines disposed substantially perpendicular to one another, exhibit excellent optical qualities.

All combinations of the aforementioned embodiments throughout the entire disclosure are hereby expressly contemplated in one or more non-limiting embodiments even if such a disclosure is not described verbatim in a single paragraph or section above. In other words, an expressly contemplated embodiment may include any one or more elements described above selected and combined from any portion of the disclosure.

One or more of the values described above may vary by ±5%, ±10%, ±15%, ±20%, ±25%, etc. so long as the variance remains within the scope of the disclosure. The subject matter of all combinations of independent and dependent claims, both singly and multiply dependent, is herein expressly contemplated. The disclosure is illustrative including words of description rather than of limitation. Many modifications and variations of the present disclosure are possible in light of the above teachings, and the disclosure may be practiced otherwise than as specifically described herein.

It is also to be understood that any ranges and subranges relied upon in describing various embodiments of the present disclosure independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present disclosure, and such ranges and subranges may be further delineated into relevant halves, thirds, quarters, fifths, and so on.

What is claimed is:

1. A glass article having substantially perpendicular draw lines and comprising:
    A. a first outermost pane comprising soda-lime glass and having a thickness of from 1.6 to 2.5 mm;
    B. a second outermost pane comprising soda-lime glass and/or aluminosilicate glass disposed opposite said first outermost pane and having a thickness of from 0.45 to 0.80 mm; and
    C. a transparent interlayer disposed between said first and second outermost panes;
    wherein each of said first outermost pane and said second outermost pane independently has a length and comprises draw lines that extend along said length; and
    wherein said first outermost pane is bonded to said second outermost pane via said transparent interlayer such that said draw lines of said first outermost pane are disposed perpendicularly ±5° to said draw lines of said second outermost pane,
    wherein said soda-lime glass of said first outermost pane comprises: $SiO_2$ in an amount of from 65 to 75 weight %, $Al_2O_3$ in an amount of from 0 to 3 weight %, CaO in an amount of from 5 to 15 weight %, MgO in an amount of from 0 to 10 weight %, $Na_2O$ in an amount of from 5 to 15 weight %, and $K_2O$ in an amount of from 0 to 5 weight %, wherein a sum of the amounts of $Na_2O$ and $K_2O$ is from 10 to 15 weight %, each based on a total weight of said soda-lime glass.

2. The glass article of claim 1 wherein said second outermost pane comprises said soda-lime glass comprising $SiO_2$ in an amount of from 65 to 75 weight %, $Al_2O_3$ in an amount of from 0 to 3 weight %, CaO in an amount of from 5 to 15 weight %, MgO in an amount of from 0 to 10 weight %, $Na_2O$ in an amount of from 5 to 15 weight %, and $K_2O$ in an amount of from 0 to 5 weight %, wherein a sum of the amounts of $Na_2O$ and $K_2O$ is from 10 to 15 weight %, each based on a total weight of said soda-lime glass.

3. The glass article of claim 1 wherein said second outermost pane comprises said aluminosilicate glass comprising $SiO_2$ in an amount of from 60 to 70 weight %, $B_2O_3$ in an amount of from 0 to 5 weight %, $Al_2O_3$ in an amount of from 1 to 15 weight %, $P_2O_5$ present in an amount of from 0 to 5 weight %, $Li_2O$ present in an amount of from 0 to 5 weight %, $Na_2O$ present in an amount of from 12 to 18 weight %, $K_2O$ present in an amount of from 0 to 5 weight %, MgO present in an amount of from 5 to 12 weight %, CaO present in an amount of from 0 to 10 weight %, SrO present in an amount of from 0 to 5 weight %, BaO present in an amount of from 0 to 5 weight %, ZnO present in an amount of from 0 to 5 weight %, $ZrO_2$ present in an amount of from 0 to 5 weight %, $TiO_2$ present in an amount of from 0 to 5 weight %, $SnO_2$ present in an amount of from 0 to 5 weight %, and Cl present in an amount of from 0 to 5 weight %, each based on a total weight of said aluminosilicate glass.

4. The glass article of claim 1 having a crossbend dimension of from 0.1 to 50 mm and a radius of curvature of from 0 to 50,000 mm, as determined by a LP-150F-C Conductive Plastic Linear Sensor and a 5200 Spring Loaded Probes, respectively.

5. The glass article of claim 1 wherein said first outermost pane is soda-lime glass.

6. The glass article of claim 1 wherein said first outermost pane has a thickness of 2.00 to 2.10 mm and wherein said second outermost pane has a thickness of 0.55 to 0.70 mm.

7. The glass article of claim 1 wherein said second outermost pane is soda-lime glass.

8. The glass article of claim 1 wherein said second outermost pane is aluminosilicate glass.

9. The glass article of claim 1 wherein said second outermost pane is a hybrid of soda-lime glass and aluminosilicate glass.

10. The glass article of claim 1 that is further defined as a windshield.

11. The glass article claim 1 wherein each of said first and second outermost panes is curved.

12. The glass article of claim 1 wherein said transparent interlayer is in direct contact with said first and second outermost panes.

13. A method of forming a glass article having substantially perpendicular draw lines, said method comprising the steps of:
    A. forming a first pane of soda-lime glass via a float process wherein the first pane has a thickness of from 1.6 to 2.5 mm,
    B. forming a second pane of soda-lime glass and/or aluminosilicate glass via a float process wherein the second pane has a thickness of from 0.45 to 0.80 mm,
    C. cutting a first blank from the first pane and a second blank from the second pane wherein each blank has a length and comprises draw lines that extend along the length;
    D. forming the first and second blanks into a desired shape;
    E. providing an interlayer;
    F. aligning the first shaped blank, the interlayer, and the second shaped blank such that the draw lines of the first blank are disposed perpendicularly ±5° to the draw lines of the second blank;
    G. combining the first shaped blank, the interlayer, and the second shaped blank thereby forming the glass article comprising a first outermost pane having a thickness of from 1.6 to 2.5 mm, a second outermost pane disposed opposite the first outermost pane and having a thickness of from 0.45 to 0.80 mm, and the interlayer disposed between the first and second outermost panes, wherein each of the first outermost pane and the second outermost pane has a length and comprises the draw lines that extend along the length, and the draw lines of the first outermost pane are disposed perpendicularly ±5° to the draw lines of the second outermost pane,
wherein the soda-lime glass of the first outermost pane comprises: $SiO_2$ in an amount of from 65 to 75 weight %, $Al_2O_3$ in an amount of from 0 to 3 weight %, CaO in an amount of from 5 to 15 weight %, MgO in an amount of from 0 to 10 weight %, $Na_2O$ in an amount of from 5 to 15 weight %, and $K_2O$ in an amount of from 0 to 5 weight %, wherein a sum of the amounts of $Na_2O$ and $K_2O$ is from 10 to 15 weight %, each based on a total weight of said soda-lime glass.

14. The method of claim 13 wherein the second outermost pane comprises the soda-lime glass comprising $SiO_2$ in an amount of from 65 to 75 weight %, $Al_2O_3$ in an amount of from 0 to 3 weight %, CaO in an amount of from 5 to 15 weight %, MgO in an amount of from 0 to 10 weight %, $Na_2O$ in an amount of from 5 to 15 weight %, and $K_2O$ in an amount of from 0 to 5 weight %, wherein a sum of the amounts of $Na_2O$ and $K_2O$ is from 10 to 15 weight %, each based on a total weight of the soda-lime glass.

15. The method of claim 13 wherein the second outermost pane comprises the aluminosilicate glass comprising $SiO_2$ in an amount of from 60 to 70 weight %, $B_2O_3$ in an amount of from 0 to 5 weight %, $Al_2O_3$ in an amount of from 1 to 15 weight %, $P_2O_5$ present in an amount of from 0 to 5 weight %, $Li_2O$ present in an amount of from 0 to 5 weight %, $Na_2O$ present in an amount of from 12 to 18 weight %, $K_2O$ present in an amount of from 0 to 5 weight %, MgO present in an amount of from 5 to 12 weight %, CaO present in an amount of from 0 to 10 weight %, SrO present in an amount of from 0 to 5 weight %, BaO present in an amount of from 0 to 5 weight %, ZnO present in an amount of from 0 to 5 weight %, $ZrO_2$ present in an amount of from 0 to 5 weight %, $TiO_2$ present in an amount of from 0 to 5 weight %, $SnO_2$ present in an amount of from 0 to 5 weight %, and Cl present in an amount of from 0 to 5 weight %, each based on a total weight of the aluminosilicate glass.

16. The method of claim 13 wherein said step of combining is further defined as laminating such that the interlayer is further defined as a transparent interlayer.

17. The method of claim 13 wherein the first outermost pane is soda-lime glass.

18. The method of claim 13 wherein the first outermost pane has a thickness of 2.00 to 2.10 mm and wherein said second outermost pane has a thickness of 0.55 to 0.70 mm.

19. The method of claim 13 wherein the second outermost pane is soda-lime glass, aluminosilicate glass, or a hybrid of soda-lime glass and aluminosilicate glass.

20. The method of claim 13 wherein the interlayer is in direct contact with the first and second outermost panes.

* * * * *